United States Patent [19]
Austin

[11] Patent Number: 5,337,191
[45] Date of Patent: Aug. 9, 1994

[54] BROAD BAND PASS FILTER INCLUDING METAL LAYERS AND DIELECTRIC LAYERS OF ALTERNATING REFRACTIVE INDEX

[75] Inventor: R. Russel Austin, Novato, Calif.

[73] Assignee: Photran Corporation, Lakeville, Minn.

[21] Appl. No.: 46,232

[22] Filed: Apr. 13, 1993

[51] Int. Cl.$^5$ ............................ G02B 7/18; G02B 5/28
[52] U.S. Cl. ........................... 359/885; 359/359; 359/360; 359/586; 359/588
[58] Field of Search ............... 359/359, 360, 585, 586, 359/589, 580, 885

[56] References Cited

U.S. PATENT DOCUMENTS

| | | | |
|---|---|---|---|
| 4,145,113 | 3/1979 | Ranninger et al. | 359/589 |
| 4,865,405 | 9/1989 | Kageyama | 359/580 |
| 4,960,310 | 10/1990 | Cushing | 359/585 |
| 5,183,700 | 2/1993 | Austin | 428/216 |

OTHER PUBLICATIONS

"Induced Transmission in Absorbing Films Applied to Band Pass filter Design", Peter H. Berning and A. F. Turner, J. Opt. Soc. Am, 47, 3, 230–9 (Mar. 1957).
"A new approach to the design of metal-dielectric thin-film optical coatings", H. A. Macleod, Optical Acta, 25, 2, 93–106 (1978).
"Coatings with Induced Transmission", P. H. Lissberger, Applied Optics, 20, 1, 95–104, (Jan. 1981).

Primary Examiner—Eugene R. LaRoche
Assistant Examiner—Nguyen, Tan

[57] ABSTRACT

A visible light transmitting, near-infrared reflecting filter for a substrate, comprises a central group of layers (26) including two metal layers (32 and 36) separated by a spacer-layer (34) and bounded by admittance-matching layers (32 and 38). The spacer-layer has an optical thickness of less than one-half wavelength of visible light and the admittance-matching layers have an optical thickness of less than one-quarter wavelength of visible light. On each side of the central group is a group of layers (24 and 28) for boosting near infrared reflectivity of the filter, and for providing low reflection and high transmission for visible light. Each of these near-infrared-reflection-boosting groups including a high refractive index layer (40 and 42) and at least one low refractive index layer (46 and 48). The high index layer has an optical thickness of about one-quarter wavelength at a near-infrared wavelength, and the low refractive index layer has a refractive index of less than one-quarter wavelength at the near-infrared wavelength.

16 Claims, 11 Drawing Sheets

BROAD BAND PASS FILTER INCLUDING METAL LAYERS AND DIELECTRIC LAYERS OF ALTERNATING REFRACTIVE INDEX

TECHNICAL FIELD OF THE INVENTION

The present invention relates in general to multilayer optical interference filters. It relates in particular to a band pass filter combining metal layers and alternating high and low refractive index transparent dielectric layers. The filter is particularly effective as a visible-light-transmitting, heat-reflecting mirror.

DISCUSSION OF BACKGROUND ART

In the prior art, two basic approaches have been favored for providing filters which transmit all, or some portion, of the visible spectrum and reflect infrared radiation.

These two basic approaches are well known to those skilled in the art, accordingly they are discussed only briefly below.

A first approach involves depositing multilayer interference band pass filters comprising, entirely, dielectric layers.

Multilayer band pass filters may be in the form of multiple cavity or multiple half-wave band pass filters, which include a combination of alternating high and low refractive index dielectric layers, some of which have an optical thickness of about one quarter-wavelength at a particular wavelength, and some of which have an optical thickness of one-half of that wavelength. The wavelength at which the layers are one-quarter or one-half wavelength thick is generally designated the center wavelength, and generally corresponds to the frequency center of the wavelength range to be passed by the filter.

Multilayer band pass filters may also be in the form of combination of long and short wavelength pass filters, often termed edge filters. The combination generally includes at least one filter defining a short wavelength edge and designed to pass wavelengths longer than the short wavelength edge, and one filter defining a long wavelength edge and designed to pass all shorter wavelengths.

An advantage of all dielectric filters is that, because of the very low absorption possible in dielectric layers, transmission may be very high. Transmission may be limited essentially by the degree to which reflection can be reduced in the wavelength range to be passed by the filters.

A disadvantage of all-dielectric filters is that as many as twenty layers may be required to provide an adequately steep transition from a reflecting region, or stop region, to a transmission region. Fifty or more layers may be required to extend a stop region over a wide band of wavelengths. Extended stop regions are a particular problem for wavelengths longer than the wavelength region to be passed, as layers must be made increasingly thicker to block increasingly longer wavelengths. Further, complex layer configurations are required to prevent high order reflection bands of long wavelength blocking layers from appearing in the wavelength range to be passed.

A second approach to the deposition of multilayer band pass filters was proposed in a paper "Induced Transmission in Absorbing Films Applied to Band Pass Filter Design", Berning and Turner, J. Opt. Soc. Am. 74, 3, 230–239. In this approach, a metal layer, preferably a silver layer, is bounded on either side by multilayer dielectric reflecting layer systems comprising stacks of alternating high and low refractive index layers, each about one-quarter wavelength optical thickness at about the center of a wavelength range to be passed. On the long wavelength side of this range, the metal layer provides the desired blocking reflection. Such filters are generally termed induced transmission filters. Transmission is essentially "induced" through the metal layer by the quarter-wave multilayer stacks, which reduce reflection from the metal layer in the wavelength range to be passed.

Such filters were originally proposed as suitable for passing limited wavelength ranges, and were used, for example, as color filters in electro-optical systems. They are now used in a very simple form as low-emissivity (heat retaining) coatings for architectural glazing. In this simple form the metal layer is relatively thin, for example, about 10 nanometers (nm), and the dielectric stack is reduced to only one relatively high refractive index layer.

This simple form has a disadvantage that as the silver layer is relatively thin (for providing a pass region sufficiently wide to accommodate the visible spectrum) the filter is not effective in blocking near infrared wavelengths which make up a large proportion of the solar spectrum.

U.S. Pat. No. 3,682,528 (Apfel et al.) discloses a heat reflecting filter including two silver layers separated by a dielectric layer and bounded by dielectric layers. Such a filter is essentially two of the above described simple induced transmission filters in coherent optical contact. Each simple filter is generally designated a "period" by optical multilayer designers. In a paper "Graphics in Optical Coating Design", Applied Optics, 11, 6, 1303–12, Apfel teaches graphic design methods for designing filters including two, three, four, and more such periods, and illustrates their theoretical performance.

A "period" in such a filter may be conveniently designated by a shorthand notation DMD, wherein D represents a dielectric layer and M represents a metal layer. A two period filter would be designated DMDMD, a three period filter would be designated DMDMDMD, and so on. Those familiar with the thin film design art will be aware of the approximate thicknesses of the D and M layers in such filters.

In theory at least, a four period (four silver layer—DMDMDMDMD) induced transmission filter will provide, using only nine layers, a pass region extending over the visible spectrum, and a stop region extending from the near infrared region across essentially the entire infrared region. As discussed above, providing a similar stop region using dielectric layers would require more than fifty layers.

In practice, routinely producing even a two period, DMDMD type, broad band induced transmission filter is made difficult by the requirement for thin silver layers. Such thin layers provide at least two significant problems.

First, there is a problem of achieving and retaining optical properties of the silver film which are theoretically predictable. This problem has been addressed by depositing each silver layer on a nucleating layer of a metal such as nickel to provide the desired property. This is discussed in the above-referenced Apfel et al. patent. Once the layer is deposited, the silver is preferably protected by a barrier layer or the like before depositing a dielectric layer. This is not uncommon if layers of the filter are formed by sputter deposition. Such a barrier layer is discussed in U.S. Pat. No. 4,462,883 (Hart).

A second problem lies in controlling the pass band characteristics of the filter, particularly the transmission and reflection colors, even if the silver layer properties can be controlled. This problem is identified by Berning in a paper "Principles of Design of Architectural Coatings", Applied Optics, 22, 24, 41274141. The problem arises because when the silver layers have a thickness of about 11.0 nm or less, optimum dielectric layer thickness, particularly the spacer-layer thickness, is a sensitive function of silver layer thickness. This is explained in further detail below.

U.S. Pat. No. 5,183,700 discloses one alternative method of constructing a broad band pass filter wherein a single metal layer, preferably a single silver layer, provides long wavelength infrared reflection, and near-infrared reflection is augmented by means of high and low refractive index dielectric layers. In a preferred embodiment, the filter comprises five layers, and includes only one silver layer, the layer having a thickness of about 20 nm. The performance of the filter is comparable with, or even superior to, a DMDMD filter wherein the two metal layers (M) each have a thickness of about 10 nm.

It would be useful to provide a filter which has the characteristics of a prior art DMDMDMDMD (four metal layer) filter, but which preferably requires only two metal layers, preferably two silver layers each having a thickness greater than 12.5 nm.

SUMMARY OF THE INVENTION

It is an object of the present invention to provide a multilayer visible light transmitting broad band pass near-infra-red reflecting optical interference filter including two metal layers. It is another object of the present invention that the filter have a spectral response characteristic of a prior art induced-transmission broad band pass filter including four metal layers. It is yet another object of the present invention that metal layers in the filter have a thickness greater than about 12.5 nm.

The above and other objects are realized, in one embodiment of the present invention, by providing a filter including at least ten layers, the layers designated the first through the tenth in consecutive numerical order beginning with the layer furthest from the substrate.

The first layer is a layer of a transparent material having a low refractive index and having an optical thickness of about one-eighth wavelength at a first wavelength located in the near-infrared spectral region.

The second and tenth layers are layers of a transparent material having a high refractive index and having an optical thickness of about one-quarter wavelength at the first wavelength.

The third and ninth layers are layers of a transparent material having a high refractive index and having an optical thickness between one-quarter and one-eighth wavelength at the first wavelength.

The fourth and eighth layers are layers of a transparent material having a high refractive index and having an optical thickness of less than one-quarter wavelength at a second wavelength located in the visible spectrum.

The fifth and seventh layers are semi-transparent metal layers and have a thickness between about 12.5 and 30.0 nanometers.

The sixth layer is a layer of a transparent material having a high refractive index and an having an optical thickness of less than one-half wavelength at the second wavelength.

The first wavelength is between about 800 and 1250 nanometers and the second wavelength is between about 480 and 560 nanometers. The high refractive index is between about 1.65 and 2.65 at a wavelength of about 520 nm, and the low refractive index is between about 1.35 and 1.65 at a wavelength of about 520 nm.

In another embodiment of the present invention an eleventh layer may be added between the tenth layer and the substrate. The eleventh layer is a layer of a material having the low refractive index and has an optical thickness of about one-eighth wavelength at the first wavelength.

The metal layers each include at least one metal selected from the group consisting of aluminum, copper, gold, rhodium, and silver. Preferably both metal layers include silver.

In yet another, non-exhaustive embodiment of the present invention a visible light attenuating near-infrared reflecting filter is provided by adding, between the tenth layer and the substrate, an eleventh layer which includes a transition metal nitride, selected from the group consisting of titanium nitride, zirconium nitride, hafnium nitride, vanadium nitride, niobium nitride, tantalum nitride, and chromium nitride, or a grey metal selected from the group consisting of chromium (Cr), cobalt (Co), iron (Fe), molybdenum (Mo), neodymium (Nd), niobium (Nb), nickel (Ni), palladium (Pd), platinum (Pt), tantalum (Ta), titanium (Ti), tungsten (W), vanadium (V), and zirconium (Zr). The layer preferably includes titanium nitride.

In still another non-exhaustive embodiment of the present invention a filter includes twelve layers and three metal layers. In one example the filter has a transmission of about 0.02 percent at a 1060 nm and is suitable for use as a filter to protect against laser radiation at that wavelength.

In any of the above or other embodiments of the present invention, any one of the layers of transparent material may include at least two sub-layers of different transparent materials having the same or different refractive indices- Further, in any of the above or other embodiments of the present invention, an auxiliary-layer may be added between any of the metal layers and a transparent layer adjacent thereto. The function of the auxiliary-layer may be at least one of the group consisting of an adhesion-promoting-layer, a glue-layer, a barrier-layer, a primer-layer, a protective-layer, and a nucleation-layer.

The layer system may be deposited by any of the well-known deposition methods, including sputtering, thermal evaporation, and chemical vapor deposition.

BRIEF DESCRIPTION OF THE DRAWINGS

The accompanying drawings, which are incorporated in and constitute a part of the specification, schematically illustrate a preferred embodiment of the invention and, together with the general description given above and the detailed description of the preferred embodiment given below, serve to explain the principles of the invention.

DETAILED DESCRIPTION OF THE INVENTION

Before proceeding with a detailed description of the present invention, it is instructive to analyze prior art approaches to providing a visible light transmitting near-infrared reflecting broad band pass filter to identify the source of at least some of the problems which have been encountered in attempting to routinely produce such devices on a large scale or in large volumes.

Particularly important is the problem of color control identified by Berning in the above mention paper. One source of this problem can be identified with reference to FIG. 1 and FIG. 2. In these illustrations are depicted graphs illustrating variation of certain characteristics of a prior art generally symmetrical (metal film thicknesses equal) DMDMD type filter as a function of metal layer thickness.

Figure 1:
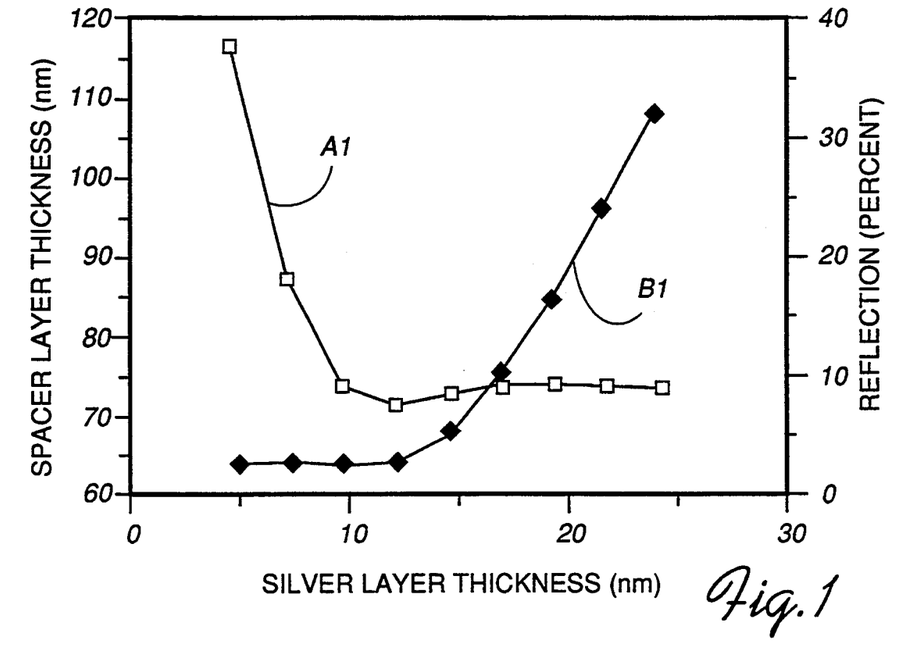
FIG. 1 is a graph schematically illustrating the dependance of dielectric spacer-layer thickness with silver layer thickness and lowest available reflectivity in a prior art symmetrical DMDMD band pass filter wherein the dielectric layers are zinc oxide layers.

In FIG. 1, curve A1 depicts the variation of the thickness of the spacer-layer (the dielectric layer between the metal layers) which provides the lowest average reflection in the visible spectrum between about 425 nm and 675 nm. On the scale of FIG. 1, the boundary dielectric layers do not vary significantly by comparison with the spacer-layer. Curve B1 indicates the value of the average reflectivity corresponding to the spacer-layer thickness of curve A1. In FIG. 1, the metal layers are assumed to be silver layers. The dielectric layers are assumed to be zinc oxide layers having a refractive index of about 1.9 at a wavelength of about 520 nm. It is evident that only a small range of silver thickness exists between about 10 nm and 12.5 nm in which the spacer-layer thickness and reflectivity, and, as a result, potentially the transmission and reflecting color, are not sensitively dependent on silver layer thickness variations.

Figure 2:
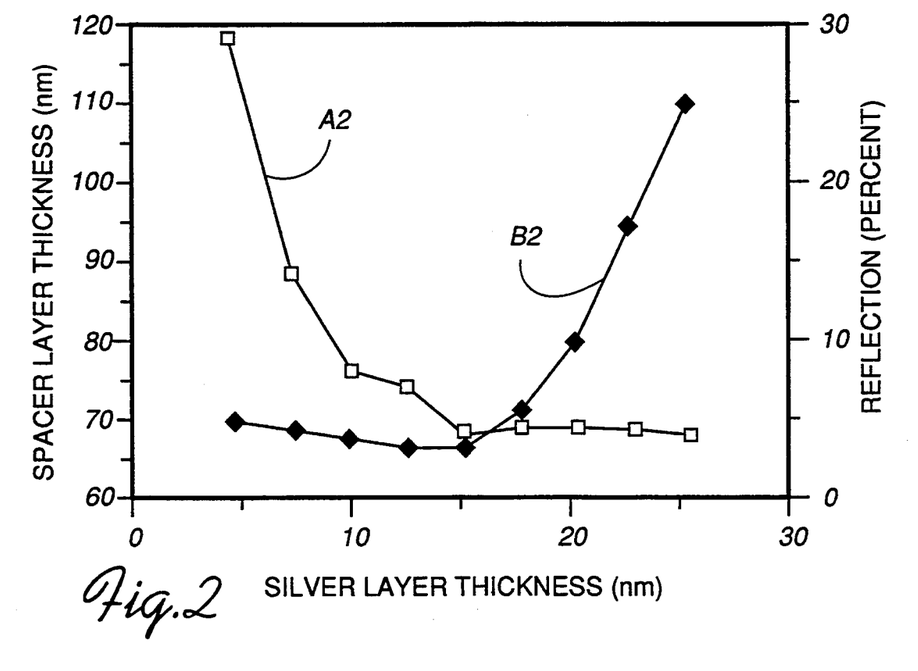
FIG. 2 is a graph schematically illustrating the dependance of dielectric spacer-layer thickness with silver layer thickness and lowest available reflectivity in a prior art symmetrical DMDMD band pass filter wherein the dielectric layers are titanium dioxide layers.

In FIG. 2 the variations of FIG. 1 are shown for a symmetrical DMDMD filter wherein the metal (M) layers are silver and the dielectric (D) layers are titanium dioxide. Curve A2 depicts spacer thickness, and curve B2 depicts reflectivity. From FIG. 2 it is evident that the higher index of TiO2 compared with ZnO permits lower reflectivity to be obtained using thicker silver films. It can also be seen, however, that there is a smaller practical range of silver thickness wherein spacer thickness and reflectivity are not sensitively dependent on silver-layer thickness.

In U.S. Pat. No. 5,183,700, the disclosure of which is hereby incorporated by reference, is described an arrangement wherein the spectral performance characteristics of a DMDMD type filter can be realized in a filter having only one metal film. On one side of the metal layer is a single dielectric layer having a relatively high refractive index, and on the other side of the metal layer, between the metal layer and a substrate on which the filter is deposited, is an arrangement of alternating high and low refractive index dielectric layers, at least one of which is a layer of a high refractive index material having an optical thickness of about one-quarter wavelength at a wavelength between about 800 nm and 1250 nm in the near-infrared spectral region. A preferred silver film thickness is about 20 nm. In a preferred five-layer embodiment of the invention, reflectivity through most of the visible spectrum is about three percent or less.

The filter disclosed in U.S Pat. No. 5,183,700, while useful in the form of its preferred embodiment, has certain restrictions and disadvantages. One disadvantage is that when the metal layer is a silver layer, the filter performs optimally when the alternating high and low refractive index dielectric layers are located between the metal layer and a substrate on which the filter is deposited. The single dielectric layer which overcoats the metal layer is sufficiently thin that it affords little protection for an metal such as silver, which is easily degraded by mechanical abrasion or by environmental exposure.

It has been determined that the filter concept affords little flexibility for increasing near-infrared reflection, and, thus, reducing near-infrared transmission. By way of example, if silver film thickness is increased significantly beyond 20 nm, transmission bandwidth is narrowed unacceptably and visible reflection and color are increased unacceptably. If additional dielectric layers, for example another two layers, are added, to boost reflectivity in the nearinfrared region, the reflection boost is only effective in the region between 800 nm and 1000 nm, and is offset by an increased transmission in the region from about 1100 nm to 1500 nm. This increased transmission is due to induced transmission effects created by the additional dielectric layers, and is often termed a "leak" by practitioners of the optical filter design art. It has been determined that this leak effect occurs even if the additional layers are added to the filter on the side of the metal layer furthest from the substrate, thus providing a dielectric stack on each side of the metal layer.

Figure 3:
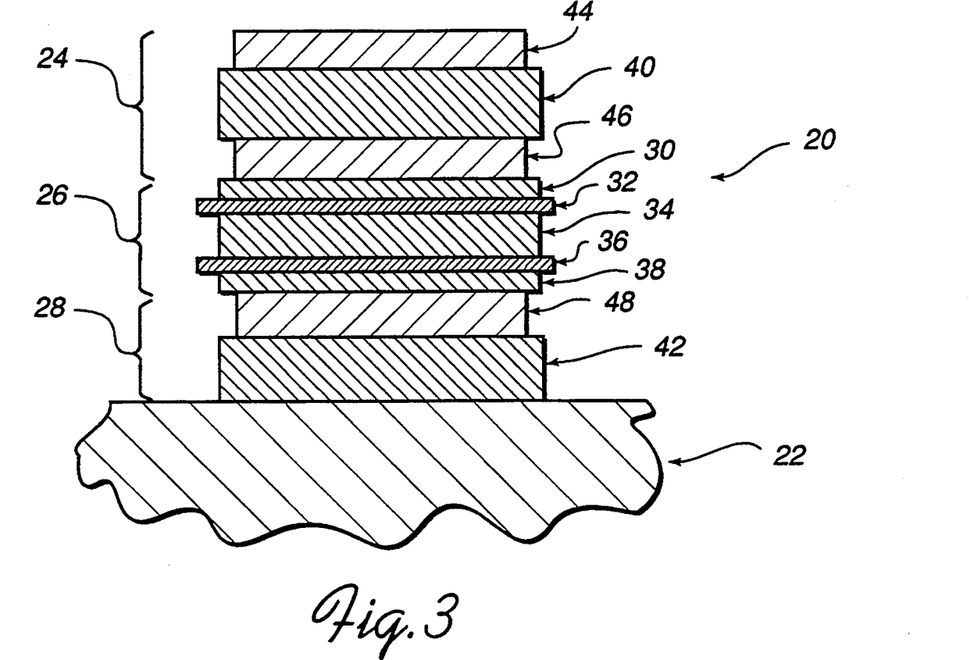
FIG. 3 schematically illustrates one embodiment of a layer system including two metal layers and forming a ten-layer filter in accordance with the present invention.

Referring now to FIG. 3, the structure of one preferred embodiment 20 of the present invention is depicted. The filter includes ten basic layers, deposited on a substrate 22. Generally, substrate 22 is a transparent substrate such as glass or plastic. The ten basic layers may be conveniently designated the first through the tenth, in consecutive numerical order, beginning with the layer furthest from substrate 22. The filter can be described in terms of three basic functional groups 24, 26, and 28. Group 26 is a group including two metal layers 32 and 36 (the fifth and seventh layers). Layer 32 and 36 are preferably silver layers, but any one of the layers may include a metal selected from the group consisting of aluminum, copper, gold, rhodium, and silver. The layers preferably have a thickness between about 12.5 nm and 30 nm.

The metal layers 32 and 36 are spaced apart by a spacer-layer 34. Spacer layer 34 preferably includes a transparent material having a high refractive index and has an optical thickness of less than one half-wavelength at a wavelength generally in the center of the visible spectrum, for example, a wavelength between about 480 nm and 560 nm. The visible spectrum is generally considered to extend from a wavelength of about 425 nm to a wavelength of about 675 nm.

Boundary layers or admittance-matching layers 30 and 38, respectively the fourth and eighth layers, are layers of a high refractive index material and have a thickness of less than about one-quarter wavelength at a wavelength between about 480 nm and 560 nm.

Group 26 is similar to a prior art DMDMD type filter, with the exception that the silver layers are significantly thicker than would be optimum in such a filter. This is demonstrated further below. Groups 24 and 28 are reflection boosting groups which provide a rapid reflection cut-on for the filter in the near-infrared spectral region but also, in combination with admittance-matching layers 30 and 38, provide broad band low reflection throughout the visible spectrum.

Each of groups 24 and 28 includes a layer of a high index material, respectively the second layer 40 and the tenth layer 42, having an optical thickness of about one-quarter wavelength at a wavelength between about 800 nm and 1250 nm, i.e., in the near-infrared spectral region. Group 24 includes two layers 44 and 46, respectively the first and third layers, of a material having a low refractive index. Layers 44 and 46 have an optical thickness of about one-eighth wavelength at the near infrared wavelength between about 800 nm and 1250 nm. Group 28 includes one layer 48, the ninth layer, which is of a material having a low refractive index and has an optical thickness of about one-eighth wavelength in the near-infrared spectral region.

During computer optimization (refinement) of layers in the system it will be found that layers 46 and 48 may assume a thickness somewhat greater or less than one-eighth wavelength at the near-infrared wavelength, but, in most cases, will generally assume an optical thickness which is less than one-quarter wavelength at the near-infrared wavelength.

Figure 4:
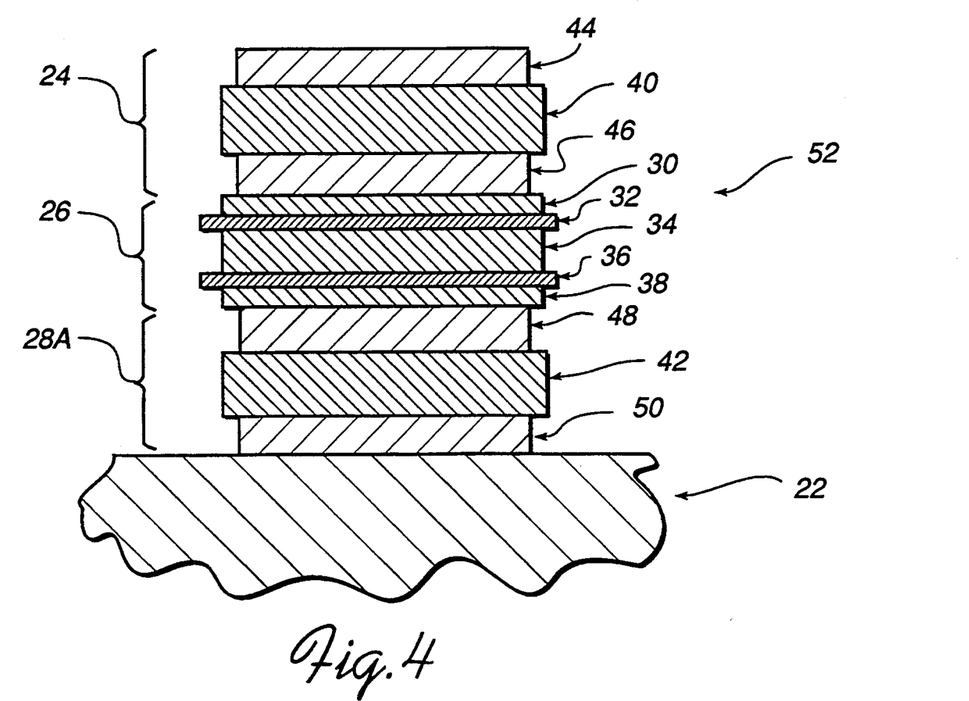
FIG. 4 schematically illustrates one embodiment of a layer system including two metal layers and forming an eleven-layer filter in accordance with the present invention.

Referring now to FIG. 4, group 28 of filter 20 may be replaced by a group 28A to form an eleven-layer embodiment 52 of the present invention. Group 28A includes ninth and tenth layers 48 and 42 respectively, and an eleventh layer 50 of a material having a low refractive index and an optical thickness of about one-eighth wavelength at the near-infrared wavelength.

Selection of materials for the high and low refractive index layers will depend, among other factors, on the deposition process used for depositing the layers, and the desired optical and mechanical characteristics of the filter. A preferred group of low refractive index materials consists of magnesium fluoride ($MgF_2$), thorium fluoride ($ThF_4$), and silicon dioxide ($SiO_2$). A preferred group of high refractive index materials includes zinc sulfide (ZnS), titanium dioxide ($TiO_2$), tantalum oxide ($Ta_2O_5$), niobium oxide ($Nb_2O_5$), zinc oxide (ZnO), tin oxide ($SnO_2$), indium oxide ($In_2O_3$) and indium tin oxide (ITO).

Referring now to Table 1, one example of the ten-layer filter of FIG. 3 is shown. The layer thicknesses in Table 1 were generated by optimizing the general layer thickness specification, given above, to achieve as low a reflection as possible in the spectral range from 425 nm to 675 nm. Niobium oxide was selected for the high refractive index material. Silicon dioxide was selected as the low refractive index material. For the optimization, silver layer thicknesses were fixed at 20.0 nm and second and tenth layer thicknesses were fixed at about 202.0 nm, i.e., about one-quarter wavelength at a wavelength of about 920 nm.

Figure 5:
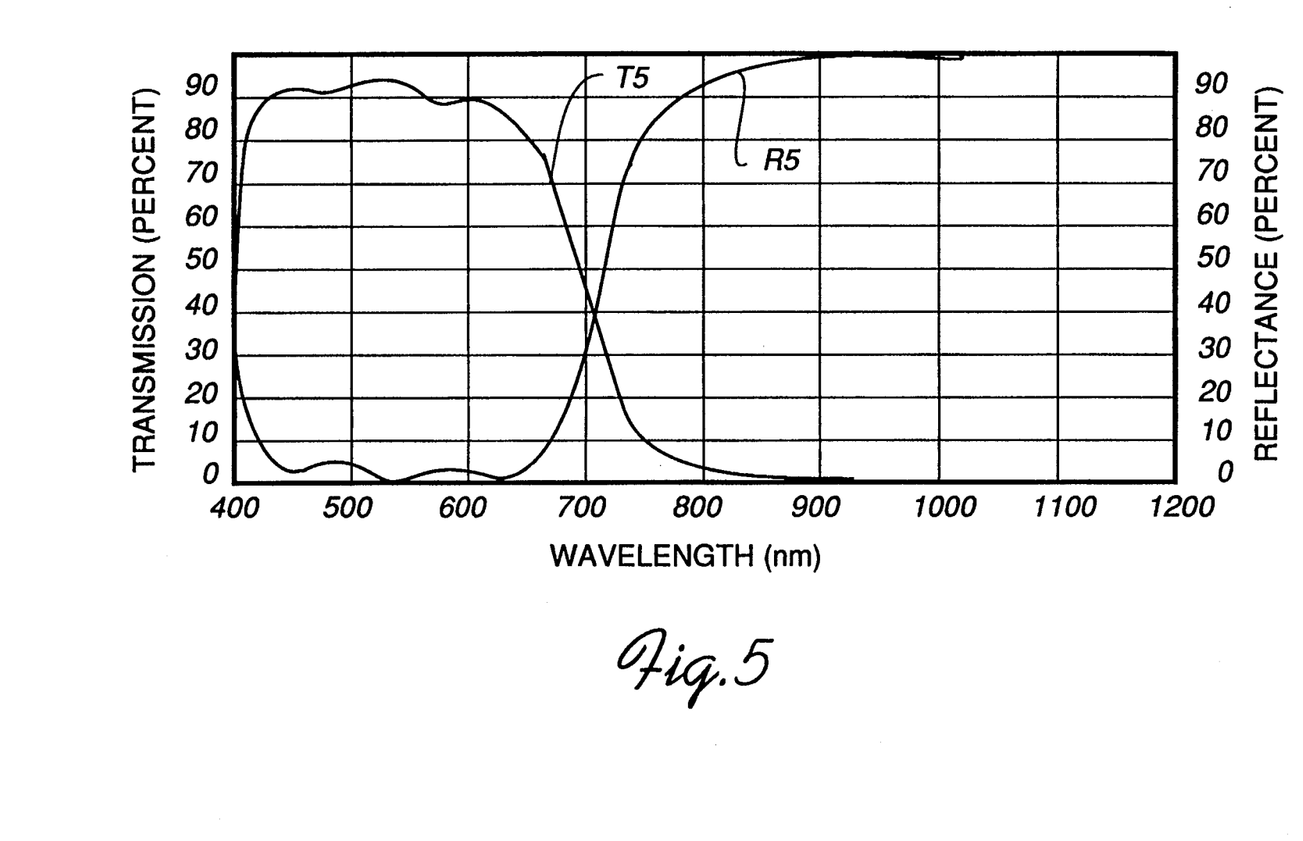
FIG. 5 is a graph schematically illustrating computed reflectivity and transmission as a function of wavelength from 400 nm to 1200 nm of an example of the filter of FIG. 3 wherein the metal layers are silver layers of equal thickness.

The computed transmission (Curve T5) and reflection (Curve R5) as a function of wavelength of the layer system of Table 1 is shown in FIG. 5. The refractive index of the glass substrate in this and all other examples described below is assumed to be glass having a refractive index of about 1.52 at a wavelength of about 520 nm. By way of comparison, the computed transmission (Curve T6) and reflection (Curve R6) as a function of wavelength for a prior art DMDMD filter, wherein the metal layers (M) are silver layers having a thickness of 20.0 nm and the dielectric layers are layers of Nb205, is shown in FIG. 6.

Figure 6:
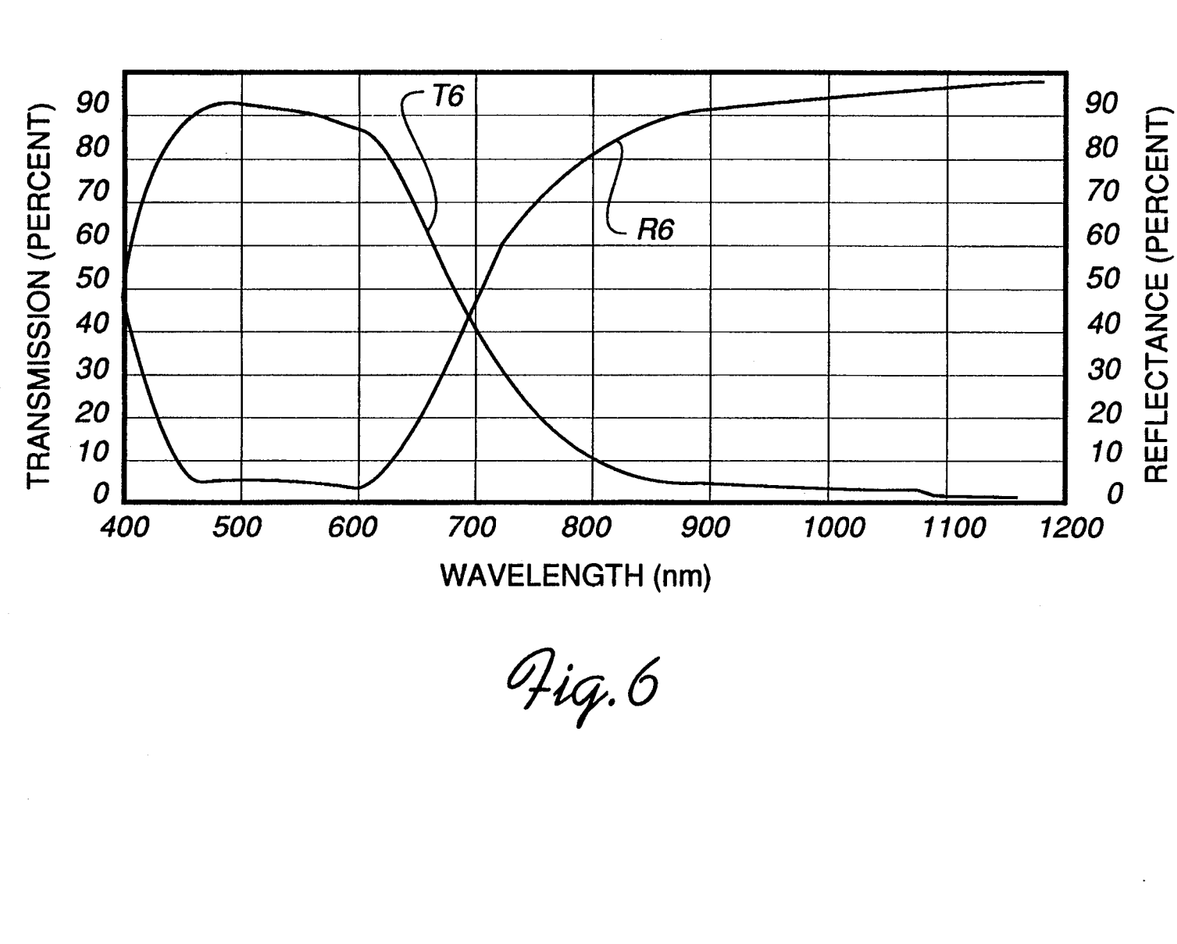
FIG. 6 is a graph schematically illustrating computed reflection and transmission as a function of wavelength of a prior art DMDMD band pass filter including two silver layers each having a thickness of about 20.0 nm.

It can be seen, by comparing FIGS. 5 and 6, that the present invention affords lower reflection and higher transmission at visible wavelengths than the prior art filter while providing significantly higher reflection and lower transmission for near-infrared wavelengths.

The filter of Table 1, for example, has a theoretically achievable photopic reflectivity of about 2.2 percent, compared with a value of about 4.6 percent

TABLE 1

| Layer No. | Material Air | Thickness (nm) Medium |
|---|---|---|
| 1 | $SiO_2$ | 71.8 |
| 2 | $NB_2O_5$ | 101.0 |
| 3 | $SiO_2$ | 77.7 |
| 4 | $Nb_2O_5$ | 33.8 |
| 5 | Ag | 20.0 |

TABLE 1-continued

| Layer No. | Material Air | Thickness (nm) Medium |
| --- | --- | --- |
| 6 | Nb₂O₅ | 68.2 |
| 7 | Ag | 20.0 |
| 8 | Nb₂O₅ | 30.4 |
| 9 | SiO₂ | 91.1 |
| 10 | Nb₂O₅ | 101.0 |
|  | Glass | Substrate | for the DMDMD type filter, the theoretical performance of which is depicted in FIG. 6. It can also be seen by comparing FIGS. 5 and 6 that a significant contribution to the higher photopic reflection value of the DMDMD filter is provided by very high reflection values in the red and blue spectral regions (see Curve R6). These high values provide a very saturated purple reflection color. This color would be difficult to control in practice, and because of the high degree of saturation color variations would be strongly evident from sample to sample. Reflection Curve R5 on the other hand has generally low reflection values throughout the visible spectrum, and, while the reflection color is not neutral, the saturation value would be sufficiently low that any color variations in practical examples would be significantly less evident.

Figure 7:
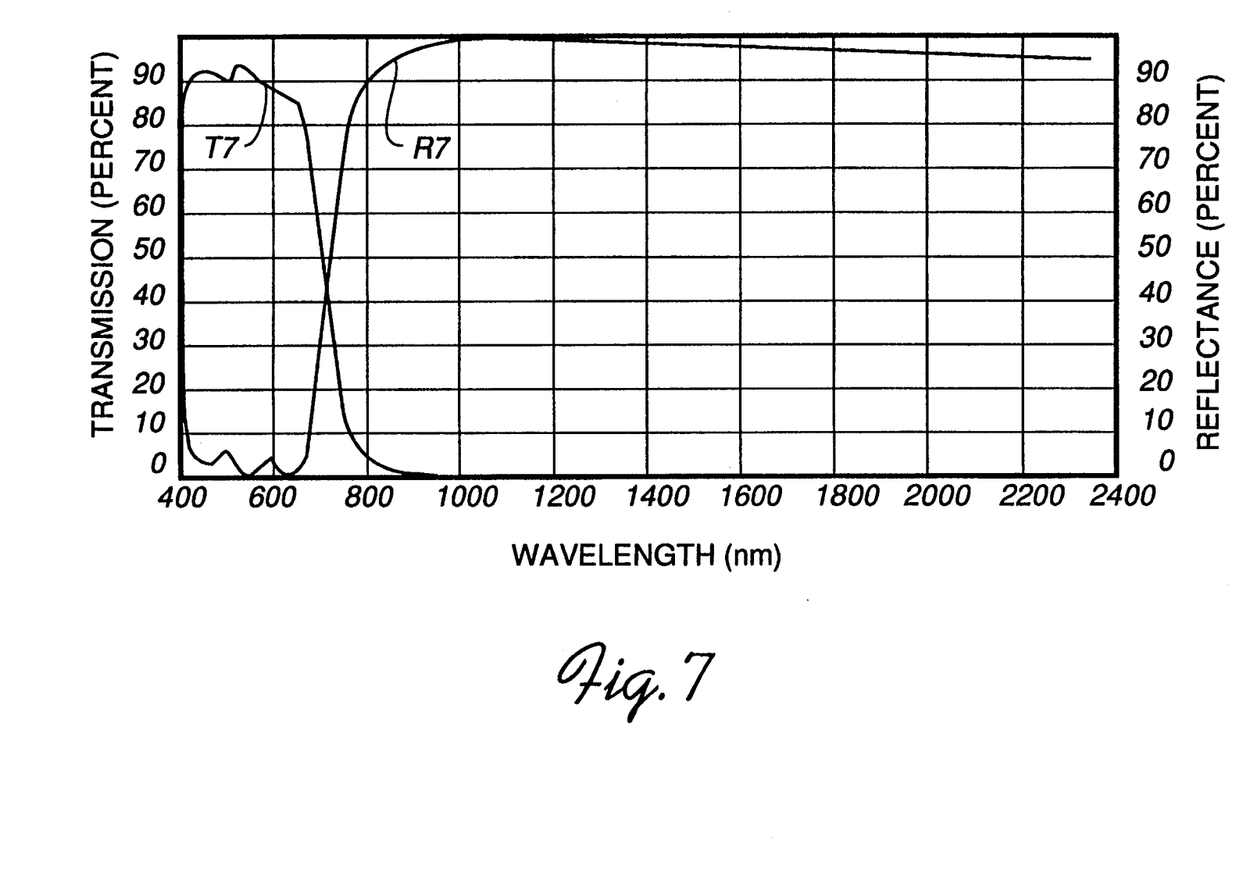
FIG. 7 is a graph schematically illustrating computed reflectivity and transmission as a function of wavelength from 400 nm to 2400 nm of the filter of FIG. 3 wherein the metal layers are silver layers.

Referring now to FIG. 7, which shows the computed transmission (Curve T7) and reflection (Curve R7) over an extended wavelength range from 400 nm to 2400 nm, it can be seen that nowhere in the spectral range from 1100 nm to 2400 nm is there a significant transmission leak resulting from the two groups 24 and 28 of near-infrared reflection boosting layers.

Referring now to Table 2, the layer thicknesses of another example of the ten-layer filter of FIG. 3 are shown. The layer thicknesses were generated by optimizing the layer system to have the lowest reflectivity in the spectral range from 425 nm to 675 nm. Only the thickness of the second and tenth layers was held constant at about 202 nm. The silver layers are of unequal thickness and each has a thickness less than the silver layers in Table 1.

TABLE 2

| Layer No. | Material Air | Thickness (nm) Medium |
| --- | --- | --- |
| 1 | SiO₂ | 77.4 |
| 2 | Nb₂O₅ | 101.0 |
| 3 | SiO₂ | 54.9 |
| 4 | Nb₂O₅ | 38.3 |
| 5 | Ag | 15.6 |
| 6 | Nb₂O₅ | 65.0 |
| 7 | Ag | 17.0 |
| 8 | Nb₂O₅ | 26.3 |
| 9 | SiO₂ | 104.3 |
| 10 | Nb₂O₅ | 101.0 |
|  | Glass | Substrate |

Figure 8:
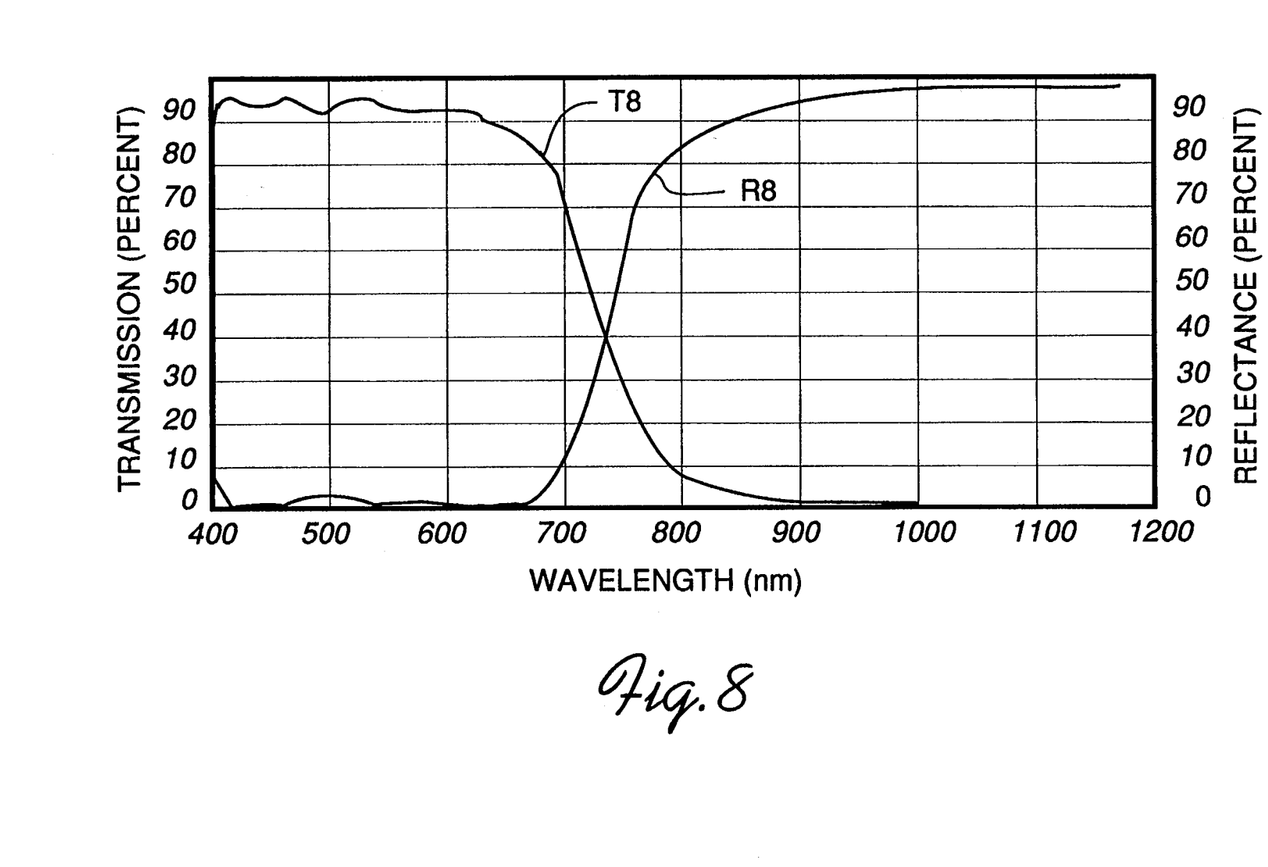
FIG. 8 is a graph schematically illustrating computed reflectivity and transmission as a function of wavelength for an example of the filter of FIG. 3 wherein the metal layers are silver layers of unequal thickness.

The computed transmission (Curve T8) and reflection (Curve R8) as a function of wavelength in the range 400 nm to 1200 nm is shown in FIG. 8. Comparing these curves with the curves of FIG. 5, a slightly broader transmission bandwidth, lower visible light reflection, and slightly decreased reflection of near-infrared radiation is evident compared with the filter of Table 1.

It will be evident to those skilled in the optical interference filter design art that many layer thickness combinations are possible, depending on the relative importance of visible light transmission, low visible light reflection, and high near-infrared reflection. Having appreciated the principles disclosed above, one skilled in the optical interference filter design art, using commercially available computation aids, may readily determine any number of examples of the present invention to satisfy particular visible transmission and near-infrared reflection objectives.

Figure 9:
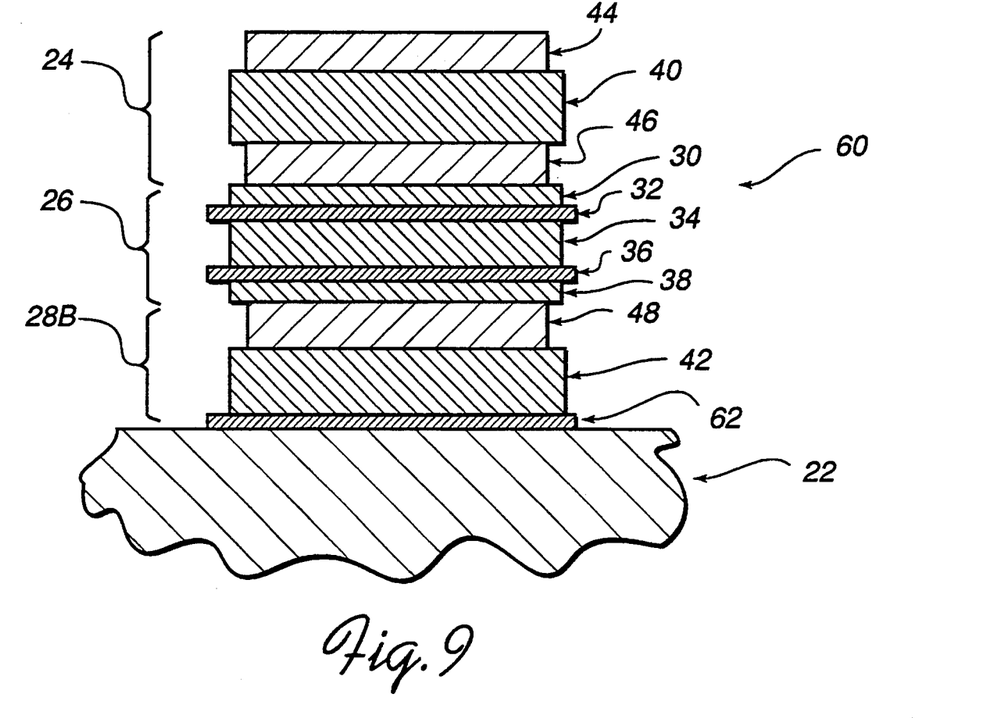
FIG. 9 schematically illustrates an eleven-layer filter in accordance with the present invention including an eleventh layer of a transition metal nitride or a grey metal.

The above described examples of the present invention are directed to providing a near-infrared reflecting filter with as high a visible transmission as possible. The visible spectrum, however, includes about forty percent of the total terrestrial solar irradiation. Because of this, in architectural design, it is often desirable not only to prevent infrared and near infrared wavelengths from being transmitted by a glazing, but also to prevent some portion of the visible spectrum from being transmitted. This object is readily achievable in an eleven-layer embodiment 60 of a filter in accordance with the present invention, one example of which is depicted in FIG. 9. Here, groups 24 and 26 include the same basic layers, specified generally in the manner of corresponding layers in the example of FIG. 3. Group 28B includes layers 48 and 42, also generally specified in the same way as corresponding layers in the example of FIG. 3. Group 28B also includes an eleventh layer 62 (the layer adjacent a substrate on which the filter is deposited) which is a partially transmitting layer for providing attenuation of visible light. Layer 62 may include a transition metal nitride selected from the group consisting of titanium nitride, zirconium nitride, hafnium nitride, vanadium nitride, niobium nitride, tantalum nitride, and chromium nitride, or a metal selected from the group consisting of Cr, Co, Fe, Mo, Nd, Nb, Ni, Pd, Pt, Ta, Ti, W, V, and Zr. Metals in this group are often referred to as absorbing metals or grey metals. The thickness of layer 62 is selected according to the degree of visible light attenuation required and the material of the layer. In most practical examples, layer 62 will have a thickness between about 2 and 40 nm.

A preferred material for layer 62 is titanium nitride. Titanium nitride is known to have low values of refractive index (n) and extinction coefficient (k), and provides an excellent optical impedance match for glass. Structural details of one example of filter 60, wherein layer 62 is a layer of titanium nitride having a thickness of 15.0 nm, are shown in Table 3.

The structure of Table 3 was optimized by beginning initially with values for the first through the tenth layers of Table 1, adding an eleventh layer of titanium nitride having a thickness of about 15 nm, and optimizing only the thickness of the tenth layer to provide lowest possible reflection between about 425 nm and 675 nm.

Figure 10:
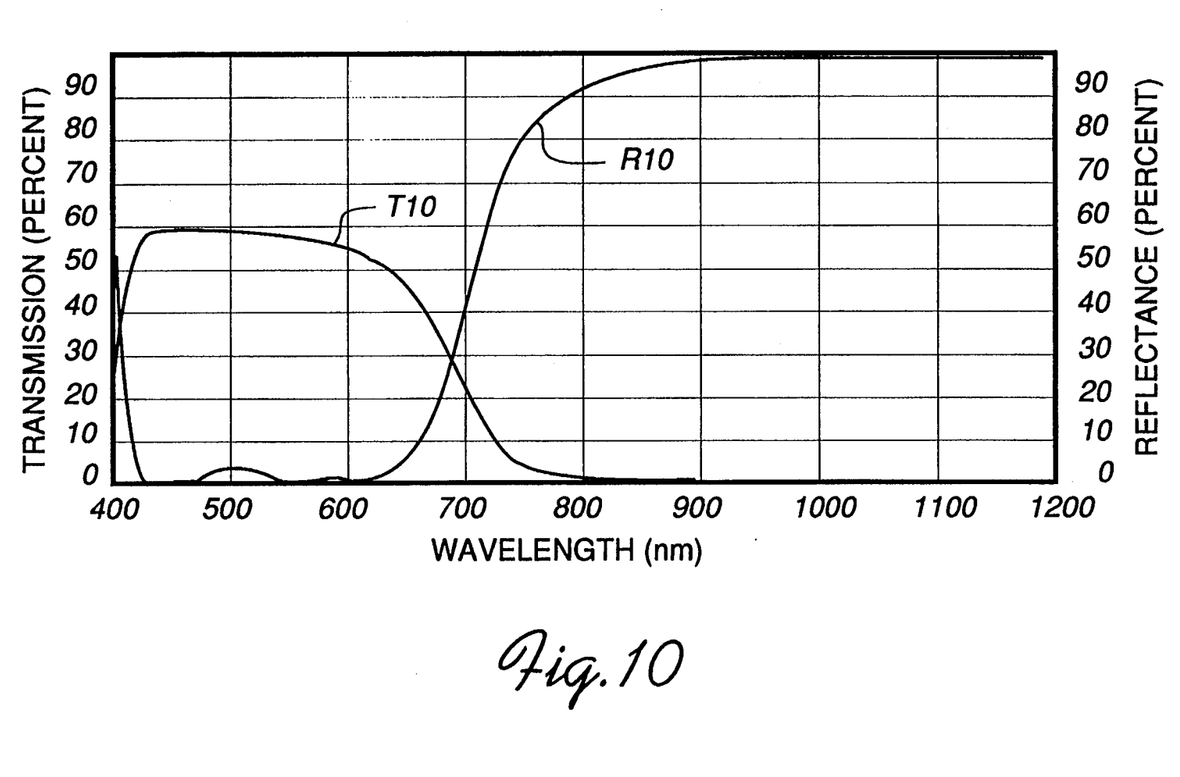
FIG. 10 is a graph schematically illustrating computed transmission and reflection as a function of wavelength from 400 nm to 1200 nm for one example of the filter of FIG. 9 wherein the eleventh layer is a titanium nitride layer.

The computed transmission (Curve T10) and reflection (Curve R10) as a function of wavelength is illustrated in FIG. 10. Comparing FIG. 10 and FIG. 5, it can be seen that layer 62 not only provides

TABLE 3

| Layer No. | Material Air | Thickness (nm) Medium |
| --- | --- | --- |
| 1 | SiO₂ | 71.8 |
| 2 | Nb₂O₅ | 101.0 |
| 3 | SiO₂ | 77.7 |
| 4 | Nb₂O₅ | 33.8 |
| 5 | Ag | 20.0 |
| 6 | Nb₂O₅ | 67 |
| 7 | Ag | 20.0 |
| 8 | Nb₂O₅ | 30.4 |
| 9 | SiO₂ | 91.0 |
| 10 | Nb₂O₅ | 133.0 |

TABLE 3-continued

| Layer No. | Material Air | Thickness (nm) Medium |
|---|---|---|
| 11 | TiN | 15.0 |
|  | Glass | Substrate | attenuation of visible light, but also contributes to providing a lower value of visible light reflection than is achieved in the filter of Table 1. The filter of Table 3 has a theoretically achievable photopic reflectivity of about 1.6 percent compared with about 2.3 percent for the filter of Table 1.

In all of the above described examples it has been assumed that basic layers of the examples are discrete continuous layers, and are deposited, one on the other, without intervening layers. It is well known however that, depending on selection of layer materials and layer deposition processes, it may be found practically convenient, or even, necessary to add an auxiliary-layer between any two adjacent basic layers of a filter structure, or between the filter structure and a substrate on which it is deposited. Such layers may be added to promote adhesion between layers or between a layer and a substrate, to provide improved optical properties of a thin metal layer when it is deposited, to preserve optical properties of a thin metal layer after it is deposited, or to provide a durable overcoating for the filter. Generally such layers are selected such that they do not interfere with the optical function of the basic layers of a filter. Such layers may be known, depending on their intended function, by one or more names included in the group consisting of an adhesion-promoting-layer, a glue-layer, a barrier-layer, a primer-layer, a protective-layer, and a nucleation-layer.

It is also well known that any basic discrete continuous layer in a multilayer interference structure may be replaced with two or more sub-layers, each sub-layer including a different material or having a different refractive index. For example, if two basic periods $D_1MD_1$ and $D_2MD_2$, wherein $D_1$ and $D_2$ are two different dielectric materials, are combined to form a basic DMDMD structure, the structure could be defined as $D_1MD_1D_2MD_2$, wherein the spacer layer would include sub-layers $D_1$ and $D_2$.

A group of three sub-layers, wherein a low refractive index sub-layer is sandwiched between a two high refractive sub-layers, may be used, for example, to simulate a basic layer having a refractive index intermediate the high and low refractive indices.

Figure 11:
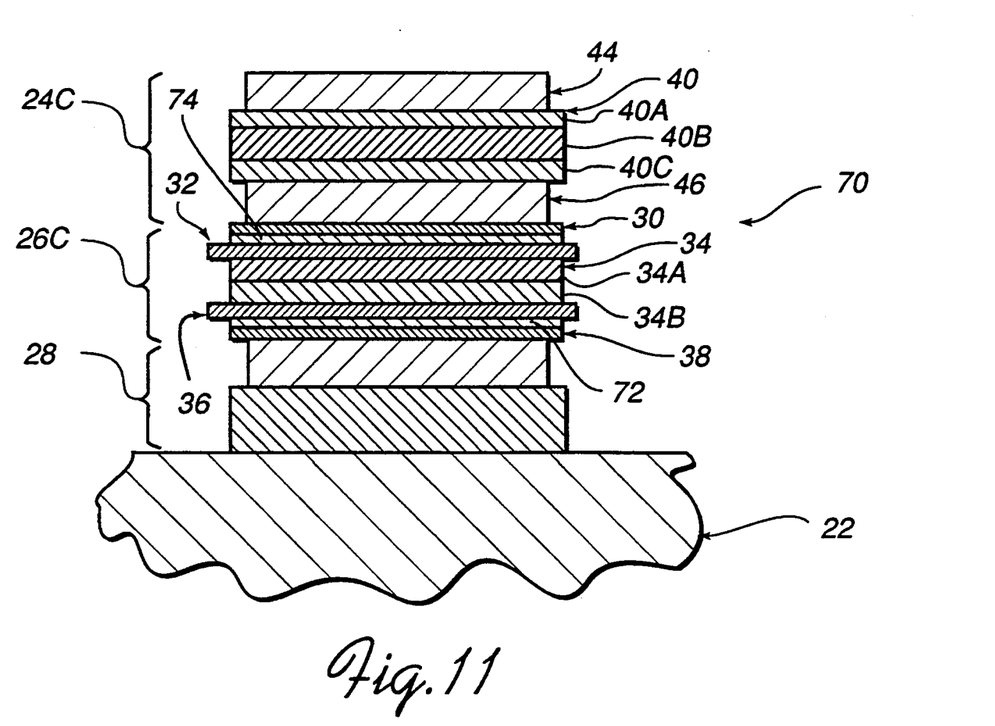
FIG. 11 schematically illustrates the filter of FIG. 3 wherein two dielectric layers each comprise sublayers having a different refractive index and wherein auxiliary- layers are included between metal layers and adjacent dielectric layers.

Referring now to FIG. 11, a filter 70, representative of the basic ten-layer filter of FIG. 3, is depicted. In filter 70, group 24C includes basic layers 44 and 46 in a discrete continuous form, while layer 40 is formed from sub-layers 40A, 40B and 40C. Group 26C includes metal layers 32 and 36, and transparent layers 30 and 38 in basic discrete form, but also includes auxiliary-layers 72 between metal layers and adjacent dielectric layers. Further, in group 26C, spacer-layer 34 is formed from two sub-layers 34A and 34B in the manner described above. Clearly, in filters in accordance with the present invention, many auxiliary-layer and sub-layer combinations are possible without departing from the spirit and scope of the invention.

While the present invention has been described in terms of a visible-light-transmitting near-infrared or heat reflecting filter, those skilled in the optical interference coating design art will appreciate that low transmission values achieved in the near-infrared may make the filter suitable in certain applications as a laser light protection coating against lasers having emission lines in the near-infrared and at longer wavelengths. A common near-infrared wavelength is 1060 nm which is characteristic, for example, of a Neodymium:YAG laser. The filter of Table 1 has a transmission at 1060 nm of about 0.1 percent.

In a laser protection filter aesthetic issues such as high visible transmission and low visible reflection. are secondary to the primary, i.e., the safety issue, which is the effective blocking of laser radiation. Accordingly, in designing a filter in accordance with the present invention for laser radiation protection, such aesthetic issues may be sacrificed if improved protection is achievable as a result.

Referring again to the filter of FIG. 3 and Table 1, a simple method of decreasing transmission at 1060 nm would be to simply increase the thickness of metal 30 layers 32 and 36 (the fifth and seventh layers) to a thickness greater than 20 nm. This would have the effect of narrowing the filter bandwidth, increasing reflection, decreasing overall visible transmission bandwidth, and imparting a pronounced green color to light transmitted, or seen through, the filter.

Referring now to FIG. 12 and again to FIG. 3, a twelve layer embodiment 80 of the filter of the present invention is depicted which effectively decreases transmission at 1060 nm with only a minimal sacrifice to visible transmission.

Figure 12:
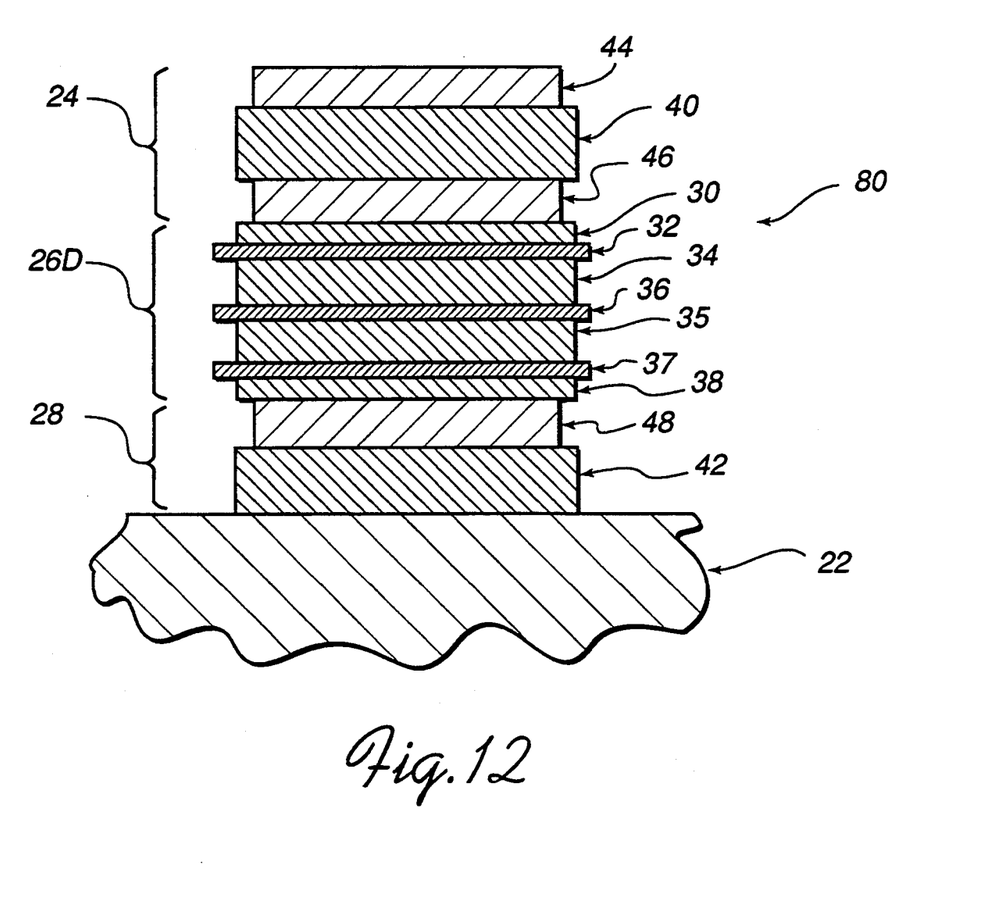
FIG. 12 schematically illustrates a twelve-layer filter in accordance with the present invention including three metal layers.

Filter 80 includes groups 24 and 28 of filter 20 of FIG. 3, however, group 28 of filter 20 is replaced with a seven layer group 26D which includes boundary layers 30 and 38, metal layers 32 and 36, and spacer layer 34 of the filter 20, and includes in addition a metal layer 37 separated from metal layer 36 by a spacer layer 35.

In filter 80 layers 44, 40, and 46 are respectively the first, second, and third layers; layers 30, 32, 34, 36, 35, 37, and 38 are respectively the fourth, fifth, sixth, seventh, eighth, ninth, and tenth layers; and layers 48 and 42 are respectively the eleventh and twelfth layers.

In Table 4 structural details of an example of filter 80 are listed. Comparing Table 4 and Table 1, it can be seen that all corresponding layers in the two tables are of the same material, and are essentially identical in thickness. The additional metal layer and spacer layer of Table 4 are essentially identical to the metal layers and spacer layer of Table 1.

Figure 14:
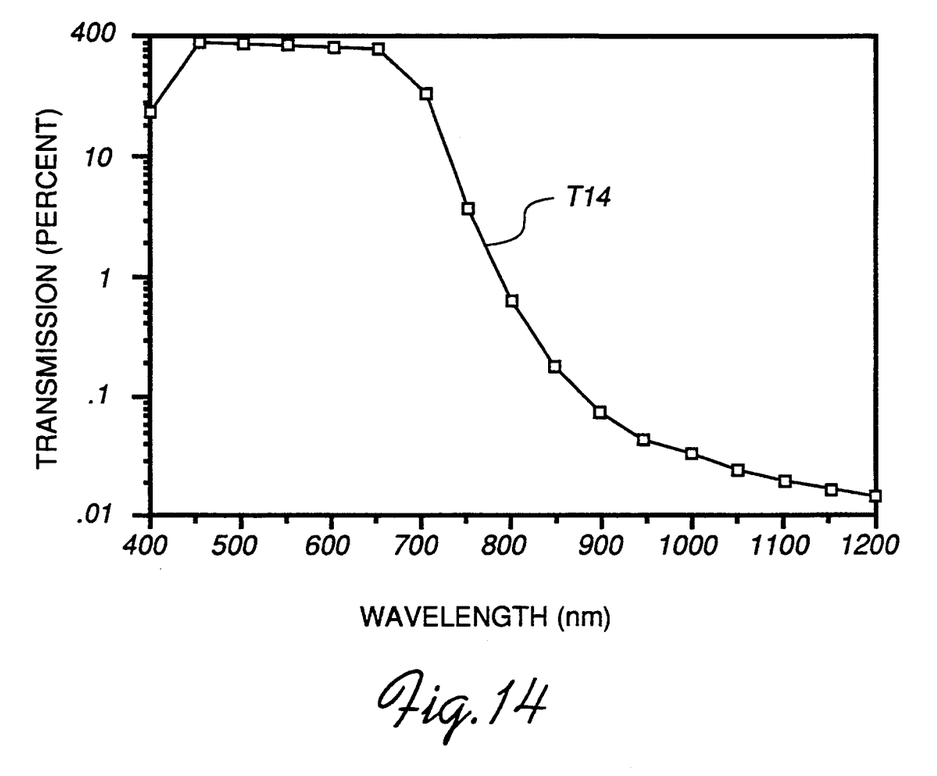
FIG. 14 is a graph schematically illustrating on a logarithmic scale low near-infrared transmission in the example of FIG. 13.

The computed transmission (Curve T13) and reflection (Curve R13) as a function of wavelength in the wavelength range from 400 nm to 1200 nm are shown in FIG. 14. In FIG. 14 transmission of filter 80 is shown (Curve T14) on a logarithmic scale. It can be seen that the transmission at about 1060 nm is about 0.025 percent.

TABLE 4

| Layer No. | Material Air | Thickness (nm) Medium |
|---|---|---|
| 1 | SiO$_2$ | 71.8 |
| 2 | Nb$_2$O$_5$ | 101.0 |
| 3 | SiO$_2$ | 77.7 |
| 4 | Nb$_2$O$_5$ | 33.8 |
| 5 | Ag | 20.0 |
| 6 | Nb$_2$O$_5$ | 68.2 |
| 7 | Ag | 20.0 |
| 8 | Nb$_2$O$_5$ | 68.2 |
| 9 | Ag | 20.0 |
| 10 | Nb$_2$O$_5$ | 30.4 |
| 11 | SiO$_2$ | 91.1 |

TABLE 4-continued

| Layer No. | Material Air | Thickness (nm) Medium |
|---|---|---|
| 12 | Nb$_2$O$_5$ | 101.0 |
| | Glass | Substrate |

Figure 13:
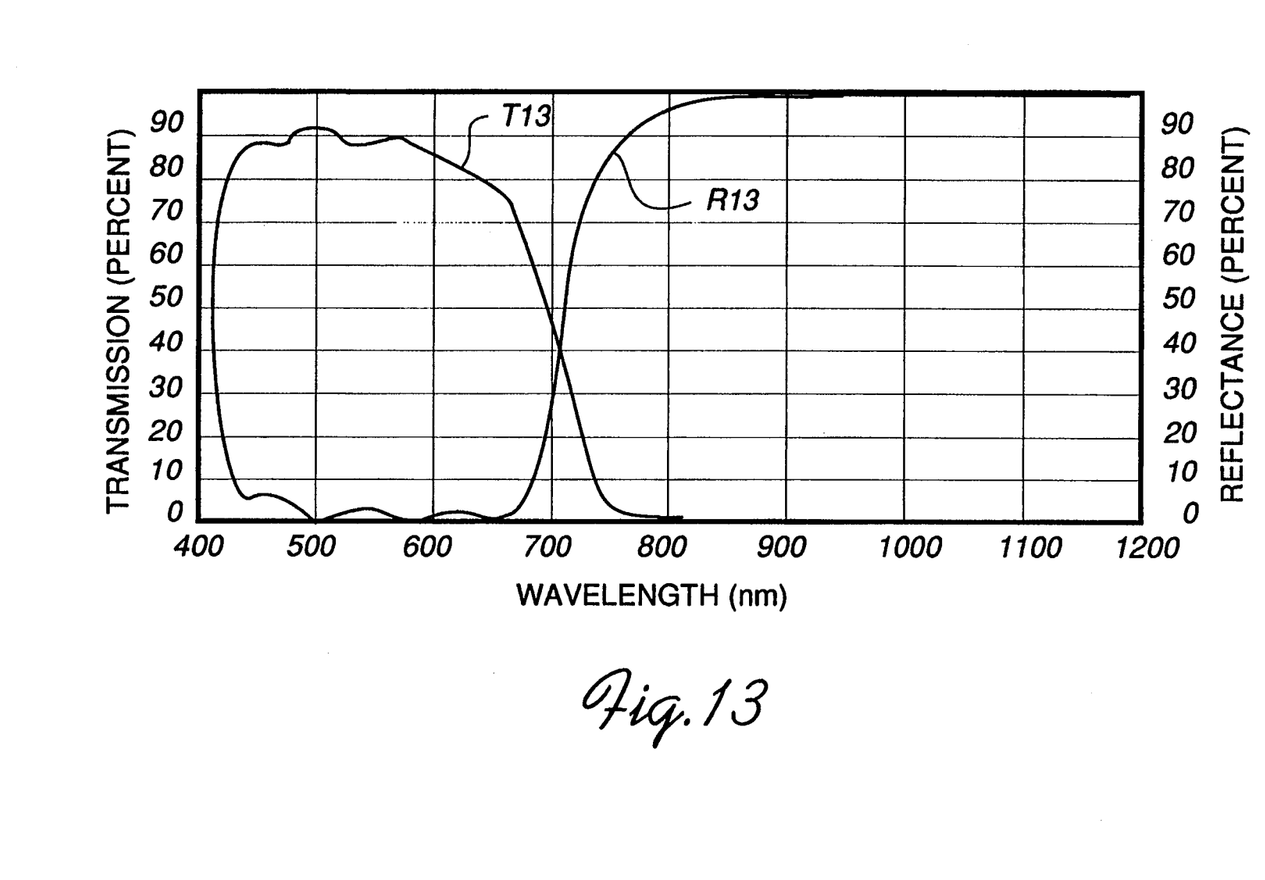
FIG. 13 is a graph schematically illustrating computed transmission and reflection as a function of wavelength from 400 nm to 1200 nm for one example of the filter of FIG. 12.

Visible transmission, as indicated in FIG. 13, is only about 5 percent less than for the filter of Table 1. The transmission difference between the filters of Tables 1 and 4 is attributable primarily to absorption in the additional silver film of the filter of Table 4. As in other above-described embodiments of the present invention, metal layers in filter 80 may have a thickness between about 12.5 nm and 30 nm. Any of the above-discussed metal or transparent materials are suitable for constructing a filter as depicted in FIG. 12. For a filter designed to reject all laser wavelengths equal to or longer than 1060 nm, zinc sulphide is preferable as a high refractive index material and thorium fluoride is preferable as a low refractive index material. These high and low refractive index materials in combination with metal layers of silver or gold would provide the highest reflection for laser wavelengths equal to or longer than 1060 nm.

In summary, a visible-light-transmitting, near-infrared-reflecting filter including metal layers and dielectric layers alternating high and low refractive index has been described. The filter provides a high degree of attenuation for near-infrared radiation while still providing high transmission and low reflection of visible radiation. In a preferred embodiment the filter includes only two metal layers, yet provides optical performance comparable with, or superior to, prior art metal-dielectric filters including four metal layers. The unique construction of the filter allows the use of two relatively thick metal layers while providing the broad bandwidth, high transmission, and low visible reflection usually associated with metal dielectric filters, wherein metal layers are significantly thinner and, as a result, are difficult to deposit reproducibly.

In a twelve-layer embodiment of the invention a third metal layer is added to decrease transmission at 1060 nm in the near-infrared spectral region. This twelve-layer filter may be useful as a filter for protecting against 1060 nm laser radiation.

The present invention has been described in terms of a preferred embodiment and a number of other embodiments. The invention, however, is not limited to the embodiments described and depicted. Rather, the scope of the invention is defined by the appended claims.

What is claimed is:

1. An optical interference filter for a substrate, comprising:
    ten layers, said layers designated the first through the tenth in consecutive numerical order beginning with the layer furthest from the substrate;
    said first layer of a material having a low refractive index and having an optical thickness of about one-eighth wavelength at a first wavelength in the near-infrared spectral region;
    said second and tenth layers of a material having a high refractive index and having an optical thickness of about one-quarter wavelength at said first wavelength;
    said third and ninth layers of a material having a low refractive index and having an optical thickness between one-quarter and one eighth wavelength at said first wavelength;
    said fourth and eighth layers of a material having a high refractive index and having an optical thickness of less than one-quarter wavelength at a second wavelength in the visible spectrum;
    said fifth and seventh layers being metal layers and having a thickness between about 12.5 and 30.0 nanometers;
    said sixth layer of a material having a high refractive index and having an optical thickness less than one-half wavelength at said second wavelength;
    said first wavelength being between about 800 and 1250 nanometers and said second wavelength being between about 480 and 560 nanometers; and
    said high refractive index being between about 1.65 and 2.65 at a wavelength of about 520 nm and said low refractive index being between about 1.35 and 1.65 at a wavelength of about 520 nm.

2. The filter of claim 1 wherein said fifth and seventh layers include silver.

3. The filter of claim 1, wherein said low refractive index material includes a material selected from the group consisting of magnesium fluoride, thorium fluoride, and silicon dioxide, said high refractive index material includes a material selected from the group consisting of zinc sulfide, titanium dioxide, tantalum oxide, niobium oxide, zinc oxide, tin oxide, indium oxide, and indium tin oxide, and said fifth and seventh layers include a metal selected from the group consisting of aluminum, copper, gold, rhodium, and silver.

4. The filter of claim 1 further including an eleventh layer of a material having said low refractive index and having an optical thickness of about one-eighth wavelength at said first wavelength.

5. The filter of claim 1 wherein at least one of said first second third fourth sixth, eighth ninth and tenth layers is formed from two or more sub-layers having a different refractive index.

6. The filter of claim 1, wherein between one of said fifth and seventh layers and a layer adjacent thereto is an auxiliary-layer having a thickness less than about 10 nm, said auxiliary-layer being defined as one or more of the group consisting of adhesion-promoting-layer, glue-layer, barrier-layer, primer-layer, protective-layer, and nucleation-layer.

7. The filter of claim 1 further including an eleventh layer said eleventh layer including a material selected from the group consisting of titanium nitride, zirconium nitride, hafnium nitride, vanadium nitride, niobium nitride, tantalum nitride, and chromium nitride.

8. The filter of claim 7 wherein said eleventh layer has a thickness between about 2 and 40 nanometers.

9. The filter of claim 8 wherein said eleventh layer includes titanium nitride.

10. The filter of claim 9 wherein said eleventh layer has a thickness between about 2 and 40 nanometers.

11. The filter of claim 1 further including an eleventh layer, said eleventh layer including a material selected from the group consisting of chromium, cobalt, iron, molybdenum, neodymium, niobium, nickel, palladium, platinum, tantalum, titanium, tungsten, vanadium, and zirconium.

12. An optical interference filter for a substrate, comprising:
    twelve layers, said layers designated the first through the twelfth in consecutive numerical order beginning with the layer furthest from the substrate;

said first layer of a material having a low refractive index and having an optical thickness of about one-eighth wavelength at a first wavelength in the near-infrared spectral region;

said second and twelfth layers of a material having a high refractive index and having an optical thickness of about one-quarter wavelength at said first wavelength;

said third and eleventh layers of a material having a low refractive index and having an optical thickness between one-quarter and one-eighth wavelength at said first wavelength;

said fourth and tenth layers of a material having a high refractive index and having an optical thickness of less than one-quarter wavelength at a second wavelength in the visible spectrum;

said fifth, seventh and ninth layers being metal layers and having a thickness between about 12.5 and 30.0 nanometers;

said sixth and eighth layers of a material having a high refractive index and having an optical thickness less than one-half wavelength at said second wavelength;

said first wavelength being between about 800 and 1250 nanometers and said second wavelength being between about 480 and 560 nanometers; and said high refractive index being between about 1.65 and 2.65 at a wavelength of about 520 nm and said low refractive index being between about 1.35 and 1.65 at a wavelength of about 520 nm.

13. The filter of claim 12 wherein said metal layers are silver layers.

14. The filter of claim 13, wherein said low refractive index material is thorium fluoride, said high refractive index material is zinc sulphide, and said fifth, seventh, and ninth layers include gold.

15. The filter of claim 13, wherein said low refractive index material is thorium fluoride, said high refractive index material is zinc sulphide, and said fifth, seventh, and ninth layers include silver.

16. The filter of claim 12, wherein said low refractive index material includes a material selected from the group consisting of magnesium fluoride, thorium fluoride, and silicon dioxide, said high refractive index material includes a material selected from the group consisting of zinc sulfide, titanium dioxide, tantalum oxide, niobium oxide, zinc oxide, tin oxide, indium oxide, and indium tin oxide, and said fifth, seventh, and ninth layers include a metal selected from the group consisting of aluminum, copper, gold, rhodium, and silver.

* * * * *